United States Patent

[11] 3,603,335

[72] Inventors Warren A. Lederman;
Charles N. Petrie, both of Milwaukee, Wis.

[21] Appl. No. 24,306
[22] Filed Mar. 31, 1970
[45] Patented Sept. 7, 1971
[73] Assignee Johnson Service Company
Milwaukee, Wis.

[54] FLUIDIC LOGIC DEVICE WITH MONOSTABLE IMPACTING STREAM RESPONSE
7 Claims, 4 Drawing Figs.

[52] U.S. Cl. .......... 137/81.5
[51] Int. Cl. .......... F15c 1/20
[50] Field of Search .......... 137/81.5

[56] References Cited

UNITED STATES PATENTS

| | | | |
|---|---|---|---|
| 3,272,215 | 9/1966 | Bjornsen et al. | 137/81.5 |
| 3,323,532 | 6/1967 | Campagnuolo | 137/81.5 |
| 3,446,228 | 5/1969 | Stoufer et al. | 137/81.5 |
| 3,499,458 | 3/1970 | Korta et al. | 137/81.5 |
| 3,515,004 | 6/1970 | Ponterio | 137/81.5 X |

*Primary Examiner*—William R. Cline
*Attorneys*—Andrus, Sceales, Starke & Sawall and Arnold J. De Angelis

ABSTRACT: A pair of opposing airstreams impact within a two-dimensional rectangular chamber and establish oppositely flowing impacting streams into a pair of center bleed passageways. A control signal passageway is connected to the chamber to one side of one bleed passageway and an output passageway is connected to the chamber to the same side of the main streams and to the opposite side of the same bleed passageway. Main stream reference passageways are connected to the opposite sides of the second bleed passageway to the second or opposite of the main streams. The walls of the center bleed passageways adjacent the output passageway are planar lock-on walls to which the impacting streams attach and results in flow and pressure in the corresponding output passageway. The center bleed passageways are similarly formed except that the passageway between the output and control passageways has an aperture of a smaller area than the other bleed passageway. A control stream applied to the control passageway reduces the stream strength to shift the impact flow from the lock-on wall and remove the output.

INVENTORS
Warren A. Lederman
BY Charles N. Petrie
Andrus, Sceales, Starke & Sawall
Attorneys

FLUIDIC LOGIC DEVICE WITH MONOSTABLE IMPACTING STREAM RESPONSE

BACKGROUND OF THE INVENTION

This invention relates to a two-dimensional fluidic device and particularly to a logic device of a monostable response.

Fluidic devices employing interacting fluid streams to produce functions, heretofore generally obtained only with electronic devices, have been developed and applied in control and processing systems in recent years. A monostable-type logic element or device may be required in digital control and data processing systems wherein a first stable output is established in the absence of a control signal and a second unstable output is established during the presence of a proper input. A fluidic element which may be constructed to produce such a response is disclosed in the copending application Ser. No. 5,652 of Warren A. Lederman entitled "Two-Dimensional Fluidic Logic Device," filed Jan. 26, 1970, and assigned to the same assignee as this application. As particularly disclosed therein, the element is constructed to establish a bistable output. Generally, the element includes a pair of opposing impacting streams with the impacting streamflow established within a two-dimensional control chamber. The streams are free streams on two opposite surfaces and are confined by the chamber walls on the surfaces normal thereto. A pair of oppositely located impact flow bleed passageways is provided in the first walls with each passageway having axially spaced walls formed to define lock-on walls to which the impacting streamflow attached as a result of fluid entrainment. A first control passageway and a related first output or collector passageway are connected to the chamber in one of said first walls to one side of said bleed passageways and a second control passageway and a related second output or collector passageway are similarly provided in the same wall to the opposite side of said bleed passageways. Main stream bleed passageways are connected to the opposite sides of the first impact flow passageway in the second or opposite of said first walls.

The impact flow is shifted from a lock-on wall by temporarily changing the relative strength of the main streams to overcome the lock-on forces. If a single output passageway and a related control passageway are employed, the output signal is present only in the absence of a control signal and removed during the presence of a control signal.

SUMMARY OF THE INVENTION

The present invention is particularly directed to a two-dimensional fluidic device employing a pair of impacting streams establishing a monostable output in response to a control signal means. Generally, in accordance with the present invention, the impacting flows are aligned with a pair of oppositely extended impacting flow bleed passageways having first corresponding walls establishing a flow lock-on means and second corresponding walls establishing a nonlock-on means. The one bleed passageway has a relatively small connecting aperture and generally corresponds to the lateral flow. The second bleed passageway has a substantially larger connecting aperture. An output passageway is provided adjacent the lock-on wall of the bleed passageway having the small aperture and a control signal passageway is provided to the opposite side of such bleed passageway.

The system is established such that the impacting flow is adjacent to and locks onto the lock-on walls of the bleed passageways. A control signal applied to the control signal means reduces the strength of the one main stream to move the impact point and turn off the output during the presence of the input signal. The removal of the control signal will cause the output to turn on. The restriction of the bleed passageway enhances the switching action in response to the input control signal. The restriction appears to alter the pressure distribution and flow pattern of the impacting flow at the corresponding bleed passageway in such a manner as to reduce the lock-on forces. The restricted aperture thus reduces the cutoff pressure level with a resulting increased gain of the fluidic switching.

BRIEF DESCRIPTION OF DRAWING

The drawing furnished herewith illustrates the best mode presently contemplated by the inventors for carrying out the subject invention and clearly discloses the above advantages and features as well as others which will be readily understood by those skilled in the art from the description of the illustrated embodiment.

In the drawing.

DESCRIPTION OF THE ILLUSTRATED EMBODIMENTS

Figure 1:
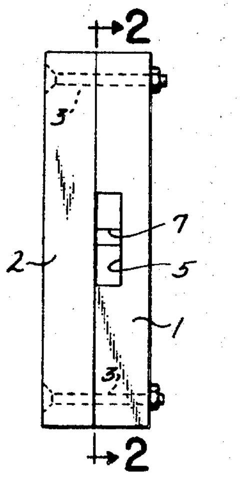
FIG. 1 is a side elevational view of a two-dimensional fluidic signal inverter constructed in accordance with the present invention.
Figure 2:
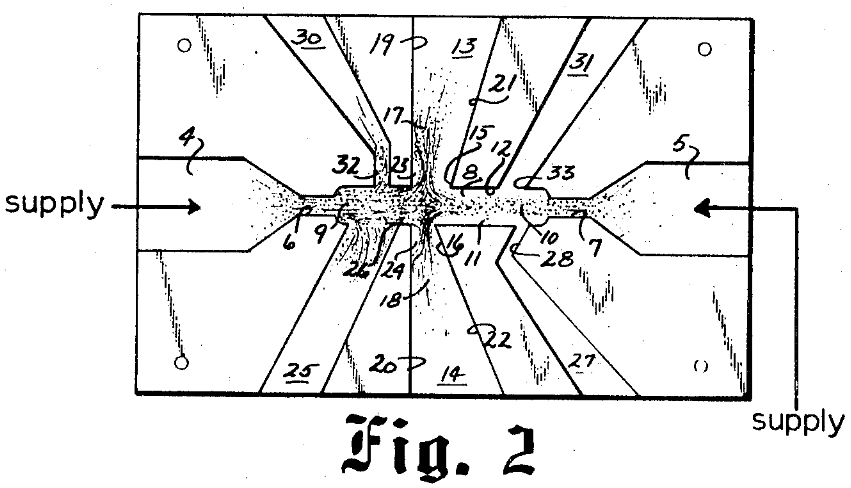
FIG. 2 is a vertical section taken generally on line 2—2 of FIG. 1.

Referring to the drawing and particularly to FIGS. 1 and 2, the illustrated fluidic inverter unit is of a two-piece construction including a recessed base 1 having a cover 2 to define a plurality of selected two-dimensional internal passageways. The cover 2 is secured in any suitable manner, as by screws 3, in fluidtight engagement to base 1. The base 1 is symmetrically formed about the centerline with a pair of main stream supply nozzles 4 and 5 to the opposite sides thereof. The nozzles 4 and 5 extend inwardly from the outer side edges of base 1 and terminate in similar main-stream-forming orifices or apertures 6 and 7 in aligned, longitudinally spaced relation. The main stream orifices 6 and 7 terminate in the opposite end walls of a reference or control chamber 8 and the nozzles 4 and 5 are connected to a suitable fluid supply to establish opposing streams 9 and 10 within chamber 8.

The fluids employed herein may be a gas, liquid, or a mixture thereof. Air is preferably employed because of the ready availability of air and convenience of referencing of such a system to the atmosphere.

The members 1 and 2 may be similarly constructed in any suitable manner such as molding of the parts of a suitable plastic or the like or machining of the appropriate passageways and chambers as generally rectangular recesses in the surface of body member 1. The chamber 8 is particularly formed as a rectangular chamber by a recess having a depth corresponding to that of apertures 6 and 7 and a substantially greater width such that the main streams 9 and 10 are confined by the base wall and cover 2 which define a pair of first sidewalls, but are essentially free streams in the opposite direction as a result of the spacing of the second sidewalls 11 and 12 of chamber 8.

A pair of reference or bleed passageways 13 and 14 are connected to chamber 8 by specially related apertures 15 and 16 at the central portion of the reference chamber 8. The passageways 13 and 14 are located on diametrically opposite sides of the impacting streams and define an exit passageway means for the impacting streamflows or streams 17 and 18. Passageways 13 and 14 are preferably referenced to atmosphere or the like to essentially isolate the output and the input signals. The base 1 with the passageways formed by appropriate recesses in the one surface in combination with the cover 2 define a two-dimensional flow pattern within the reference chamber 8. The base of the recesses and the inner planar surface of cover 2 thus confine the stream in the corresponding planes. The reference chamber 8 is wider than the orifices 6 and 7 and by appropriate referencing, the streams 9 and 10 are essentially free streams in the one direction. As a result, the pair of impacting streams 17 and 18 flows in opposite lateral directions at the point of impact into the oppositely deposed bleed passageways 13 and 14.

In accordance with the present invention, the impacting stream bleed passageways 13 and 14 are further specially constructed to produce a digital, monostable logic function. The corresponding first walls 19 and 20 of the passageways 13 and 14 define suitable stream lock-on walls and are shown as aligned flat, planar walls to which the impacting streamflows 17 and 18 attach by entrainment phenomena of the impacting streamflow. The opposite walls 21 and 22 of the respective passageways 13 and 14 are particularly formed to prevent lock-on and are shown as planar walls angled outwardly or rearwardly from the apertures 15 and 16 to define apertures of differing size.

The initial formation of the streams 9 and 10 is such that the emitted impacting streamflows 17 and 18 are angularly oriented with an outer peripheral portion contacting the lock-on walls 19 and 20. This defines corresponding cavities 23 and 24 between the boundary of the adjacent supply streams and the walls 19 and 20 within which is formed a separation bubble which is below the reference or atmospheric pressure. The result is an entrainment or aspiration fluid within the bubbles 23 and 24 from the main streamflow generally in accordance with a vortex-type phenomena. This is accompanied by a decrease of static pressure within the bubble thereby serving to hold the impacting streamflows onto the walls 19 and 20 with a resulting latching or attachment phenomena. The streamflows 17 and 18 remain in this stable condition in the absence of a selected change in the relative strength of the main supply streams.

If the relative strength of the main supply stream 9 is increased relative to the opposed stream 10 by a predetermined amount, the strength of stream 9 overcomes the lock-on forces established by the interaction of the impacting streamflows 17 and 18 and the adjacent collector walls 19 and 20 to release the flows from such walls.

In the construction of this invention, an output passageway 25 is provided to one side of the bleed passageway 14 and connected to the chamber wall by suitable connecting apertures 26. The output aperture 26 is spaced only slightly from the bleed passageway 14 and extends outwardly to the outer wall of the body 1. With the impacting streamflows 17 and 18 locked to the walls of 19 and 20, the reference chamber 8 to the left of flows 17 and 18 is essentially closed and the flow and the pressure increase establishing an output in the passageway 25, as shown in FIG. 2.

The relatively close placement of the output orifice is desirable to promote recovery of a substantial proportion of the output pressure.

Figure 3:
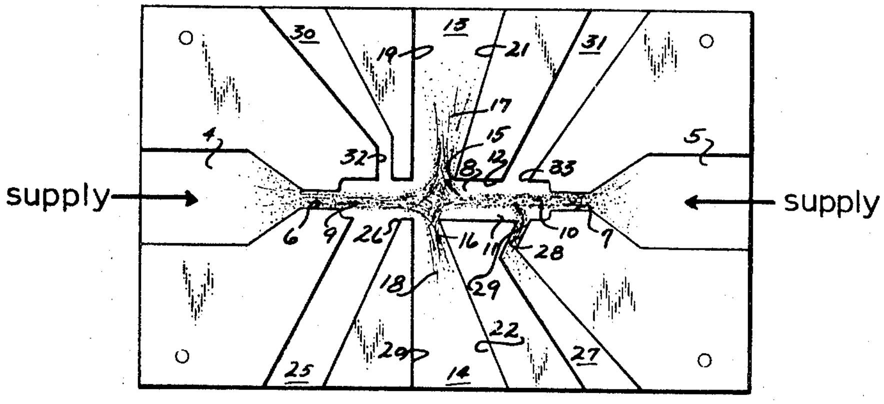
FIG. 3 is a view similar to FIG. 2 showing the alternate output position of the logic unit.

The relative strength of the main streams 9 and 10 is controlled by a control signal passageway 27 to the opposite side of the passageway 14 from the output passageway 25. The control passageway 27 terminates in a control stream orifice or aperture 28 immediately adjacent to the corresponding opposite outermost end walls of the reference chamber 8 and thus immediately adjacent the input nozzle 7 of the supply passageway 5. The control aperture 28 must be formed to the same side of the chamber 8 as the output aperture and to the opposite side of passageway 14 from the output passageway. The aperture 28 is preferably provided with a reverse angular orientation such that a control stream 29 therefrom includes a small component of force opposed to the axial flow and force of the main stream 10, as shown in FIG. 3.

The unit is constructed to initially establish the condition shown in FIG. 2. If the supply pressure at the supply orifice 7 is slightly larger than that at the supply orifice 6, the lateral flows 17 and 18 tend to be slightly cone shaped with a bias toward the lock-on walls 19 and 20. The impacting flows 17 and 18 engage the lock-on walls 19 and 20 with the formation of the lock-on bubbles 23 and 24. Correspondingly, the output pressure will build up within the chamber 8 and output passageway 25 and provide a corresponding signal.

The impacting streamflows 17 and 18 are stabilized by partial venting of the chamber 8. In the illustrated embodiment of the invention, main stream bleed passageways 30 and 31 are provided to the opposite sides of the impacting flow bleed passageway 13 in the sidewall opposite the output passageway 25 and the control passageway 27. The main stream bleed passageway 30, located opposite the output passageway, is formed with a relatively narrow aperture or orifice 32 in the sidewall of the chamber 8 in FIGS. 2 and 3. The passageway extends outwardly from the aperture to the edge of the body 1 and is also preferably referenced to atmosphere or the like. The passageway 30 is spaced from the impacting stream bleed passageway and the small aperture 32 permits the buildup of pressure within chamber 8 with the impacting flow locked to lock-on walls 19 and 20.

In summary, the lateral flow 17 and 18 is normally biased to a lock-on position such that an output flow and pressure is established within the chambers 8 to the left side of such lateral flow, the output may be interconnected to any suitable load through the output passageway 25 and the relatively large coupling aperture 26. A slight amount of flow will also emanate at the bleed passageway 30 through the relatively small connecting aperture 32. This is desirable to decouple the output and input characteristics of the inverting device and to reduce the sensitivity of the system to the output load.

In the lock-on position of FIG. 2, aspiration occurs from the control passageway 27 and the small interconnecting aperture 28. Similar aspiration will be established with respect to the bleed passageway 31. The latter feature is desirable as when an input signal is applied to the passageway 27 to partially deflect the stream 10 with respect to the stream 9, flow is vented via the bleed passageway 31 and reduces the cutoff pressure level, at which time the pressure differential of the streams 9 and 10 results in release of the lateral flows 17 and 18 from the walls 19 and 20.

The difference in the size of the apertures 15 and 16 is specially selected such that the passageway 14 is moderately restricted with respect to the lateral flow while the passageway 13 is relatively completely unrestricted with respect to its lateral flow. The relative relationship of the apertures has been found to establish reliable, digital switching such that application of a control signal via passageway 27 turns off the output during the presence of such signal. The removal of the signal immediately results in the lateral flow rapidly shifting back to walls 19 and 20 and again establishing an output. The moderate restriction of aperture 16 also contributes to minimizing of the cutoff pressure level of the input signal and thus promotes high gain. It appears that the relative moderate restriction allowing lateral flow, but being closely spaced thereto, alters the pressure distribution and flow pattern of the impact in the region immediately adjacent such aperture such that it rapidly responds to the input signal which is applied to the corresponding side of the confined stream 10. Thus, the moderate restriction appears to reduce the lock-on force between a portion of the lateral flow 18 with respect to the wall 20 and thus minimizes or reduces the strength of the force in the corresponding area. In contrast, the portion of the impact flow 17, which is above the centerline in the illustrated embodiment, is held by a relatively strong lock-on force to the corresponding wall 19 being essentially completely unaffected by the large aperture 15. Consequently, a relatively large, stable lock-on condition is maintained.

When a control signal is applied via the aperture 28, the half of the stream associated with the restricted aperture 16, that is, the lower half in the illustrated embodiment is first affected by the reduction or movement of the stream 10. This appears to establish a rotation of the impact within the chamber 8. After the lower half of the impact flow has moved away from the associated wall 20, a rapid translation of the impact flow is established and the output switches. This establishes a control signal related outlet state in which the output pressure and flow reduce to zero or the ambient pressure to which the bleed passageway 30 and the center bleed passageways 13 and 14 are connected.

The present invention thus provides a two-dimensional inverter control unit, providing a digital rather than an analog output.

Figure 4:
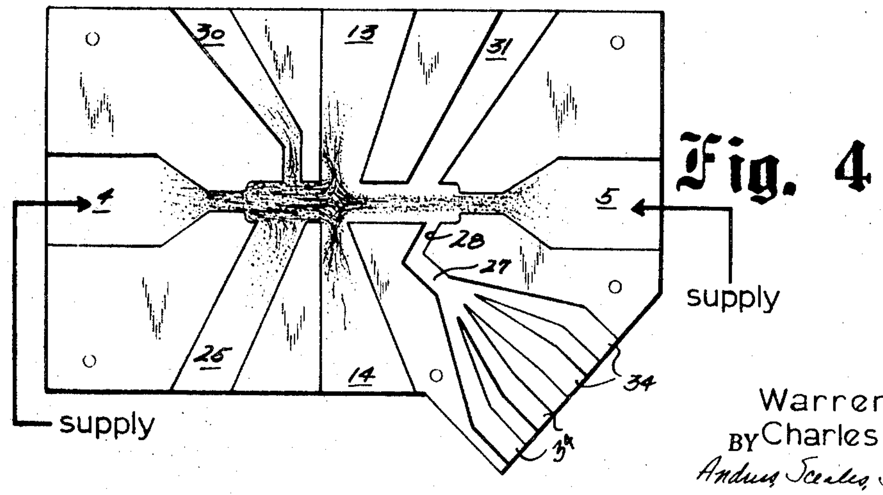
FIG. 4 is a view similar to FIG. 2 of a modified embodiment producing a NOR function output.

The inverter can be readily formed as a NOR gate element by providing a plurality of input signal sources in parallel to the passageway or the control signal aperture 28, for example, as shown in FIG. 4.

Referring particularly to FIG. 4, the corresponding elements and passageways of the embodiments of FIGS. 3 and 4 are correspondingly numbered for simplicity and clarity of explanation. The illustrated structure in FIG. 4 is identical to that shown in FIGS. 1 through 3 with the exception that the control passageway 27 is connected to a plurality of passageways 34 having separate input ends connected to suitable sources and a common output chamber connected to the input side of the aperture 28. Thus, the signal sources to the input signal passageways 34 are selected such that any one or any combination of the input signals establishes a cutoff control signal. As a result, the output signal is established in the absence of a control input at all of the passageways 34. The device thus provides the usual NOR logic function.

The present invention has been found to provide a relatively reliable and sensitive monostable-type fluidic element which can be incorporated into various digital circuits, particularly as a result of the maintaining of the isolation of the input-output characteristics.

Various modes of carrying out the invention are contemplated as being within the scope of the following claims particularly pointing out and distinctly claiming the subject matter which is regarded as the invention.

We claim:

1. A fluidic logic element having a stable output state and a control signal related output state, comprising a control chamber having first sidewalls and second connecting sidewalls and end walls, said end walls each having a mainstream-forming aperture, said main stream apertures establishing a pair of impacting streams confined by said first sidewalls and spaced from said second sidewalls and establishing a pair of opposite lateral impacting flows within said chamber, first and second impact flow bleed passageways connected to said chamber in alignment with said lateral flow positions, the first bleed passageway including a connecting aperture substantially larger than the lateral flow, the second bleed passageway including a connecting aperture generally corresponding to the lateral impacting flow, said impact flow bleed passageways each including a corresponding lock-on wall extending outwardly from the corresponding first edge of the aperture and with the impacting streamflow locked on to such lock-on wall by fluid entrainment with the impacting streamflow adjacent said wall, the opposite wall of said bleed passageways being correspondingly shaped to prevent lock-on of said impacting flows with the impacting flow adjacent the opposite walls, an output passageway having an output aperture in a first of said second sidewalls between the first edge of the second bleed passageway and the adjacent end wall, and a control passageway having a control aperture in the first of said second sidewalls between the second edge of the second bleed passageway and the adjacent end wall for creating a control signal stream to control the relative strength of said streams to selectively overcome said entrainment force and move said impacting flow from the lock-on wall means and thereby remove the output only during the presence of said control signal stream.

2. The fluidic logic element of claim 1 having a first main stream bleed passageway means having a restricted aperture in the second of said second sidewalls opposite said output passageway and referencing said impacting streams to a reference pressure, a second main stream bleed passageway means having an unrestricted aperture in the second of said second sidewalls opposite said control passageway.

3. The fluidic logic element of claim 1 having main stream bleed passageway means in the second of said second sidewalls referencing said pair of impacting streams to a reference pressure.

4. The fluidic logic element of claim 3 wherein said first and second impact flow bleed passageways are connected to said chamber by corresponding shaped rectangular apertures having aligned edges at the lock-on walls and with offset edges in the opposite walls of said bleed passageways, said opposite walls extending angularly outwardly of said offset edges and said lock-on walls.

5. The fluidic logic element of claim 3, wherein the lock-on wall means of said impact flow bleed passageway are planar walls extending outwardly from the first edge of said apertures parallel to said lateral impacting flows, said opposite walls are planar walls extending outwardly of said chamber and rearwardly of said lateral impacting flows to prevent locking of said impacting flows to said opposite walls by fluidic entrainment.

6. The fluidic logic element of claim 3, wherein said control aperture is provided with a plurality of inputs connected to said signal stream sources, each of said sources being selected to establish a signal stream operative to reduce the corresponding main stream to move said impacting flow from the lock-on walls.

7. The fluidic logic element of claim 1 wherein said control chamber is a rectangular chamber having a substantially greater length between said end walls than between said first and second sidewalls, the cross section of said apertures and passageways being rectangular, said pair of bleed passageways having said first edges aligned with each other and each of said lock-on walls being a planar wall extending outwardly at 90° to said first sidewalls, said lock-on walls being coplanar, said opposite bleed passageway walls being planar walls extending from the corresponding apertures and defining a sharp aperture edge at the connection to the chamber, and having main stream bleed passageways in the second of said second sidewalls referencing said pair of impacting streams to a reference pressure.